United States Patent
Ayyad

(10) Patent No.: US 7,860,827 B1
(45) Date of Patent: Dec. 28, 2010

(54) DATA SYNCHRONIZATION METHOD FOR AN APPLICATION DATABASE AVAILABLE ON MULTIPLE WIRELESSLY CONNECTED PLATFORMS

(75) Inventor: Tariq Ayyad, San Francisco, CA (US)

(73) Assignee: Field Automated Communication Systems, LLC, San Francisco, CA (US)

( * ) Notice: Subject to any disclaimer, the term of this patent is extended or adjusted under 35 U.S.C. 154(b) by 1073 days.

(21) Appl. No.: 11/552,132

(22) Filed: Oct. 23, 2006

(51) Int. Cl.
G06F 7/00 (2006.01)
G06F 17/00 (2006.01)

(52) U.S. Cl. ............ 707/610; 707/614; 707/617; 707/618; 707/620; 707/656

(58) Field of Classification Search .......... None
See application file for complete search history.

(56) References Cited

U.S. PATENT DOCUMENTS

| | | | |
|---|---|---|---|
| 6,223,343 B1 * | 4/2001 | Hopwood et al. | 717/101 |
| 6,317,754 B1 | 11/2001 | Peng | |
| 6,343,299 B1 | 1/2002 | Huang et al. | |
| 6,389,423 B1 | 5/2002 | Sakakura | |
| 6,952,708 B2 | 10/2005 | Thomas et al. | |
| 6,976,077 B1 * | 12/2005 | Lehew et al. | 709/229 |
| 7,032,033 B1 | 4/2006 | Ledoux et al. | |
| 7,035,879 B2 | 4/2006 | Shi et al. | |
| 7,065,658 B1 * | 6/2006 | Baraban et al. | 713/300 |
| 7,606,881 B2 * | 10/2009 | Chasman et al. | 709/221 |
| 2003/0131087 A1 * | 7/2003 | Shippy et al. | 709/223 |

* cited by examiner

Primary Examiner—Khanh B Pham
Assistant Examiner—Azam Cheema
(74) Attorney, Agent, or Firm—Thomas E. Schatzel; Law Offices of Thomas E. Schatzel A Prof. Corp.

(57) ABSTRACT

A data-synchronization computer program allows many personal portable workstations to wirelessly communicate with a server and to provide updates to an applications database. Each personal portable workstation maintains its own copy of the database with opportunistic updates that occur as the network amongst them allows. Data synchronization object data structures are generated as new data is entered at each personal portable workstation, and these are placed in synch queues for transmission when possible. Each personal portable workstation can continue to operate with its own instance of the applications database and does not depend on instant or continuous network access.

6 Claims, 6 Drawing Sheets

Figure 1:
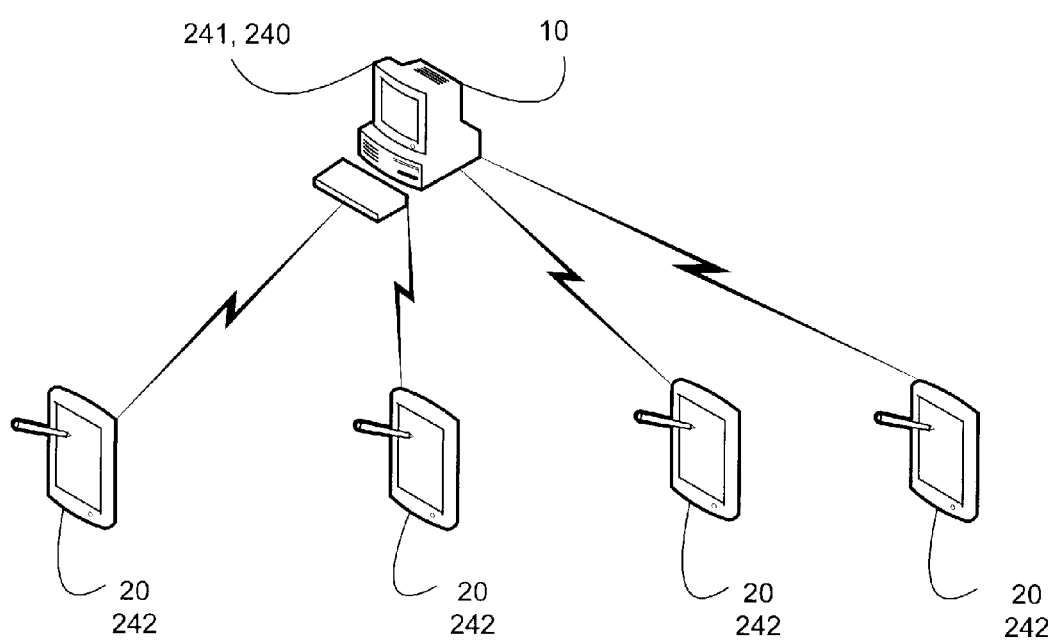

DATA SYNCHRONIZATION METHOD FOR AN APPLICATION DATABASE AVAILABLE ON MULTIPLE WIRELESSLY CONNECTED PLATFORMS

CROSS-REFERENCE TO RELATED APPLICATIONS

N/A

FEDERALLY SPONSORED RESEARCH

N/A

SEQUENCE LISTING OR PROGRAM

N/A

BACKGROUND OF THE INVENTION

Whenever a copy (instance) of a database or file is made, and the copy is updated in parallel with updates to the master or server instance of the database, there is a need to have the server instance synchronized to reflect all of the data updates to the other instances. The present invention is a synchronization method including the software that keeps a network of processors and their instances of a database synchronized. The "master" instance of the application database is maintained on one or more file servers, and each remote instance of the database is maintained on a personal portable workstation, known as a "tablet". There have been many methods proposed in the prior art to deal with this need.

BACKGROUND OF THE INVENTION

Prior Art

U.S. Pat. No. 7,065,658, issued Jun. 20, 2006 to Matthieu Baraban, et. al. discloses a cordless tablet-like computer system with a method using wireless transmission and a checkpoint/restart technique, to achieve data synchronization. However, with multiple disconnected tablets, as in the present invention, a checkpoint/restart method is inadequate to deal with the simultaneous updates occurring on multiple tablets at the same time.

U.S. Pat. No. 7,035,879, issued Apr. 25, 2006 to Shepherd S. B. Shi, et. al., discloses a transmission-based method that relies primarily on timestamps to keep track of which updates have been applied. Such an approach is not adequate for a disconnected database wherein updates are going on simultaneously, but may not be transmitted or received in the sequence in which they were generated. The present method uses a hierarchical and numbered priority scheme to determine the updates that should be applied.

U.S. Pat. No. 7,032,033, issued Apr. 18, 2006 to Eric Ledoux, et. al., discloses a method for synchronizing a server and multiple client computers with direct connection to a network. The synchronization and a collision resolution method are based on an incremental numbering system with a final resolution decision being made by a user of the system, manually. The present invention uses a set of criteria to automatically preempt or discard inappropriate updates.

U.S. Pat. No. 6,952,708, issued Oct. 4, 2005, to Edward E. Thomas, et. al. discloses a synch key method, but is also based on a checkpoint/restart method similar to U.S. Pat. No. 7,065,658. The present invention uses synchronization objects that contain the control information to effect the proper application to the database.

U.S. Pat. No. 6,389,423, issued May 14, 2002, to Takashi Sakakura, discloses a version comparison method for a number of replicated versions. The present invention could not rely on such a method as the tablets and their instances are disconnected from the master server instance and the low bandwidth communication technology could never support such a comparison in the desired response times.

U.S. Pat. No. 6,343,299, issued Jan. 29, 2002, to Yun-Wu Huang, et. al., uses a version table for the multiple records and only applies updates based on version numbers. Such a method would never work in a disconnected database network such as in the present invention.

U.S. Pat. No. 6,317,754, issued Nov. 13, 2001, to Luoscheng Peng, discloses a network of primary servers and secondary servers using a combination of direct connect and summary synchronization vectors to support peer-to-peer synchronization. The user controls the peer-to-peer synchronization whereas the present invention use automated synchronization based on server rules-based control.

SUMMARY

1. Introduction/Overview

This is a description of a synchronization method including the software that keeps a network of processors and their instances of a database synchronized. The "master" instance of the application database is maintained on one or more file servers, and each remote instance of the database is maintained on a personal portable workstation, known as a "tablet". The tablet 20 contains storage capability, communication capability (cellular technology) and processing capability. The synchronization software (known herein as "synch") keeps server instances 241 and all tablet instances 242 of the application database 240 synchronized based on business rules and the methods described herein.

The application for this software is to keep office server instances 241 of the application database 240 synchronized with tablet instances 242 in the field, i.e. remote locations away from the central office server 10 and connected to the central office server 10 only through cellular phone technology. Since cellular technology is characterized as slow and with low-volume transmission for data processing requirements, the software is optimized to run in low-bandwidth networks where connectivity is intermittent, supporting data transfers that are opportunistic, preemptable and restartable.

The principal application that created the demand for the synch methods described herein was an entity managing a construction project in which the central office server 10 needs to be updated continually by all of the lead or supervisory workers in the field, each of which has a tablet 20 with an instance 242 of the application database 240. The synch method described herein provides each tablet 20 owner and the central office server 10 with automated data synchronization such that any tablet 20 owner or office worker with access to the server 10, can both update the application database 240 as needed and also get up-to-date project information on labor costs, expenditures and progress from all the other tablet 20 owners. Even though this is the application described herein, it is obviously not limited to construction projects, and can be used by any application requiring remote synch between a server 10 and multiple tablets 20.

The useful synch method disclosed herein thus provides a largely automated service of affording remote tablet 20 data entry for use by other tablets 20 and by central management on an up-to-the-minute basis without the previously used methods of direct connection and manual intervention to effect synchronization.

The synch method consists of both manual and automated data entry on the tablets 20 and automated synchronization procedures executed by the software. In essence, database updates are initiated by tablet 20 owners and persons with central server 10 access. The synch then creates a data structure called a Data Synchronization Object (referred to here as "DSO") 30 to effect the synchronization.

The DSO 30 contains control information, priority information, originating user information and the database update data itself. The DSO 30 is then placed into a queue on the initiating tablet 20 or server 10, and if it is a queue on a tablet 20, it awaits a connection with the server 10 for transmission. When the DSO 30 is transmitted to the server 10, it contains control information as to what the server 10 should do with the update, i.e. which application database 240 tables and tablets 20 ("network peers") should receive the updates.

When a DSO 30 is generated, it is inserted into one or more synch queues 316. Each synch queue 316 is a priority queue holding all DSO's 30 scheduled to be sent to a particular peer 20 in the system.

An instance of synch manages one or more synch queues depending on whether it's a server instance 10 or a tablet instance 20. The priority is based on a strict weak ordering defined by first comparing the priority which the user assigns to a DSO 30, and then the order in which DSO's 30 are inserted into the queue 316.

Once a synch queue 316 has at least one element, the synch software tries to connect 610 to the peer 20 assigned to that queue 316. If the peer 20 is not available on the network, a retry 610 is scheduled using an exponential falloff scheme to avoid the "thundering herd" problem.

Once a connection is made 620, DSO's 30 are transmitted according to their position in the synch queue 316.

Synch queues 316 are preemptable. When a DSO 30 with a higher priority than the currently processing DSO 30 is inserted into a queue, the current transfer is suspended so that the new transfer begins immediately. This continues until the queue is empty.

When a DSO 30 is received it is parsed and applied to the local instance of the database. The next DSO 30 is not sent until the current DSO 30 is processed by the receiving database.

In this way the user can work with a local copy of the application database 240 no matter what the status of the network, and the synch software opportunistically tries to synchronize the local instance 240 of the database with the server instance 241.

2. Data Synchronization Object ("DSO") Definition

A DSO 30 is a text file created in a particular format. It is named according to the following scheme that guarantees a particular DSO 30 will have a unique name across all machines being synchronized:

[priority]-[sequence]_[machine ID].

Example: 2000-56487_31 priority: A four digit number.
See section 4, below, for a description of priorities.
sequence: A number that is set to zero when an instance is activated for the first time. This sequence is incremented each time a DSO 30 is generated.
machine ID: The server 10 always has a machine ID of zero. When a new instance is activated it is assigned an unused ID. All machines 20 being synchronized must have a unique ID.

The DSO 30 format is line based. It is divided into a header and body. The header consists of two lines followed by a blank line:

appver: The first line is the application version number. This is a string stored in the database that refers to the status of the application as a whole. This is used to determine whether a particular instance of synch is capable of importing the DSO 30. Version mismatches indicates an error that requires operator intervention.
routing string: This second line is text that defines the exact method used to determine what action the receiver of the DSO 30 takes (see section 7).

The body of the DSO 30 consists of one or more blocks, each block containing data for one table. The first line of a block contains the name of the table. The second line contains the column names. Then one or more lines of text follow, each line containing one row of data from the originating table. Each field within a row is delimited by a special character (ascii code 255, y umlaut). The end of a block is indicated by a blank line.

There are three types of DSO's:
*.syd—for synchronization of data, i.e. update of the application database 240
*.pad—Program Application Data, i.e. used by the application program
*.fod—File Object Data, i.e. graphics and other kinds of data or files from sources external to the application 3. Device or Network Startup On startup the synch software binds to a port in order to accept incoming connections and then connects to a database instance. The port and database instance are specified in a configuration file 230. This database connection 245 is held open for as long as the synch software is running. First, queries are made to the database 230 to obtain configuration information. In particular, the working directory for DSO's 30 and the table of IP addresses corresponding to synch peer 20 instances 242 are obtained. Synch then registers with the database as a listener 247 of a particular named event. When this event is fired by code executing in the database, the synch software receives a notification on its database connection 620 which it regards as a signal that new items have been inserted into the synch queue (see section 5). Finally, it makes an initial query 249 to build its internal representation of the synch queue 316 (see section 5 for more information about the structure of the synch queue 316).

After all database queries 249 have completed, the synch software connects to all peer instances 242 it knows about and informs these instances that it is up and running and ready to exchange data. Any successful connections transition into the queue transmission state. Unsuccessful connections are scheduled for retry if the peer in question has a non-empty synch queue 316.

4. Data Synchronization Object Creation

DSO 30 creation is begun by setting a column of a table named 'sstat' to the value ' ' (null). All tables that are synched must have this column. A stored procedure then runs that creates the DSO 30 file corresponding to that row of the table and any other rows in other tables that are referred to. The relationship between tables is encoded in various stored procedures that are assigned to each table 240 as appropriate.

Once the DSO 30 is created it is inserted into the synch queue 316 in order to be sent to the designated peers. A new row has to be inserted in the synch queue 316 for each peer 20 that the DSO 30 should be sent to. Each row 30 must contain the following fields:

- destination: This is the id of the peer 20 the DSO 30 is to be sent to.
  - This id corresponds to a look up table, built when synch starts up, that stores an IP address and a port for each unique id.
- version: The application version at the time the DSO 30 was created.
  - This is used by synch to ensure that a DSO 30 is compatible with the receiver.
- priority: Each DSO 30 is assigned an explicit priority that defines in what order DSO's 30 are transmitted. DSO's 30 with the same explicit priority are sent in the order they are inserted into the synch queue 316.

5. Queue Management

Insertion into the synch queue 316 is accomplished by a standard insert operation into the database table that is the persistent representation of the queue. The synch software itself must maintain an internal representation of the synch queue 316. It does this by first informing the database 240, on startup, that it is a subscriber to a database event named "synch". When an insert is made to the table 240, the database raises the named event "synch". No data can be sent along with this notification. Synch receives this notification by maintaining a file descriptor that corresponds to the open connection to the database 240.

When the database raises the event "synch" 310, the operating system Input/Output facility informs synch that there is data pending on that file descriptor. Synch then queries the database 240, via the open file descriptor, for any pending events. If the event "synch" has been raised, then synch regards its queue representation as stale and queries the database 240 to refresh its queue. This query returns the top 100 entries in the synch queue 316 for each peer. For each row returned, synch checks to see if that entry is already stored 410 in its internal queue 316. If not, it inserts the row. If a peer's queue changes state from empty to non empty, a connection attempt 610 is scheduled. If the entry at the top of a queue is different than the current executing DSO 30, then the synch software will preempt the current transfer (see section 6, Queue Transmission).

When a DSO 30 has been transmitted to a peer, the corresponding row is removed from the internal queue 316 and an insert to the database 240 is sent to mark the corresponding row in the synch table as finished. When the internal queue for a connected peer 20 becomes empty 550, synch makes a modified query to the database to return the next items scheduled to be sent, if any.

Some further actions are taken when a DSO 30 is inserted into the internal queue 316. First, the size of the DSO 30 is checked. If it less than one megabyte, an SHA1 checksum 40 is computed 510 and stored in the internal queue 316. If it is greater than one megabyte 414, the DSO 30 is broken up in to one megabyte chunks 420. An extra file is created that lists each chunk and the name of the original DSO 30 so that the receiver can reassemble the chunks. This file is called a manifest 430. This extra file is sent to the receiver by inserting it into the internal queue 316 right after the last chunk. All chunks, and the manifest 430 are then assigned 510 their SHA1 checksum 40.

6. Queue Transmission

The first part of queue transmission is connection management. Since network connectivity is not guaranteed for individual tablets 20, the system has to be robust in the face of total, but temporary, network outage. As soon as a queue becomes non empty 312, a connection attempt 610 is made. If that connection attempt 610 fails, another connection attempt 610 is scheduled. The scheduling of the next connection attempt 610 is done as follows. First, a time interval is chosen. This interval is seeded with the number of seconds since the last known network activity, or one if this connection is the first one to be attempted 610. Each time a connection attempt 610 fails this number is doubled. A random number between one and the minimum of the maximum interval (assigned as a configuration variable) and the current interval is generated, and taken to be the number of seconds to wait before making the next connection attempt 610. This exponential falloff is done to avoid the "thundering herd" problem, where due to network conditions many peers 20 regain connectivity at the same time and all try to connect at the same time, overwhelming the server 10 machine.

Once a connection is successful 620, a handshake 700 is executed where the software queries the peer 20 for its id and application version. If the id returned isn't the expected one, the connection is immediately terminated as erroneous. The application version is stored to compare against the application version associated with DSO's 30. If the handshake is successful 700, queue transmission begins. If both connected instances have DSO's 30 queued up, queue transmission occurs in parallel.

The queue is processed in the order defined by the user assigned priority and the order in which DSO's 30 were inserted. For each entry in the synch queue 316, the same steps are followed.

1. The sender sends the name of the DSO 30, the application version assigned to the DSO 30 and the checksum 40.
2. If the DSO 30 application version is greater than the receiver's application version, the connection is suspended and indicates a tablet 20 in an erroneous state.
3. The receiver sends back the number of bytes of the DSO 30 it has already received. If this number is nonzero then the DSO 30 has been partially transferred during an earlier connection.
4. The sender starts sending the DSO 30 at the position returned by step 3. The DSO 30 is retrieved from the file system in chunks of 4K. Each time a chunk is read from the file system, a check is made against the entry at the top of the queue. If a different DSO 30 is at the top of the queue than the current one, then the current transfer is preempted and step 1 is executed.
4. When all bytes have been sent, the sender signals that the transfer is complete.
5. The receiver computes the SHA1 checksum 40 for the received DSO 30. If the value is not the same as the value received in step 1, the transfer has been corrupted en route and starts over from byte zero.
6. An insert is made to a database 240 table that has a trigger responsible for DSO 30 handling (see section 7).
7. The sender is informed that the database 240 insert was successful. The sender removes the DSO 30 from the synch queues 316 (see section 5).

8. The next DSO 30 is sent. If there are no more DSO's 30 to be sent then the connection is idle in that direction.
9. When the connection is idle in both directions, the connection is terminated.

7. DSO Handling at the Destination (Receiver)

When a DSO 30 arrives at its destination/receiver the following steps are taken:
1. Its header section is read. The routing string is processed. If the routing string indicates that the DSO 30 should be sent to other peers 20 in the network, inserts are made into the synch queue 316. This routing step only happens on the server 10.
2. The body of the DSO 30 is read. Each section of the body contains data for a database 240 table. For each row contained in the DSO 30, a check is made to see whether this row already is in the database 240. If it is, an UPDATE SQL statement is constructed. If not, an INSERT SQL 530 statement is constructed.
3. Once all INSERT 530 and UPDATE statements have been generated, they are applied to the local database 240. All statements are wrapped in a transaction so no partial updates happen. Constraints are also relaxed within the transaction so that tables can be modified in any order regardless of dependencies.

DRAWINGS

Overview of Figures

FIG. 1 High level overview of an application using the present invention

Figure 2:
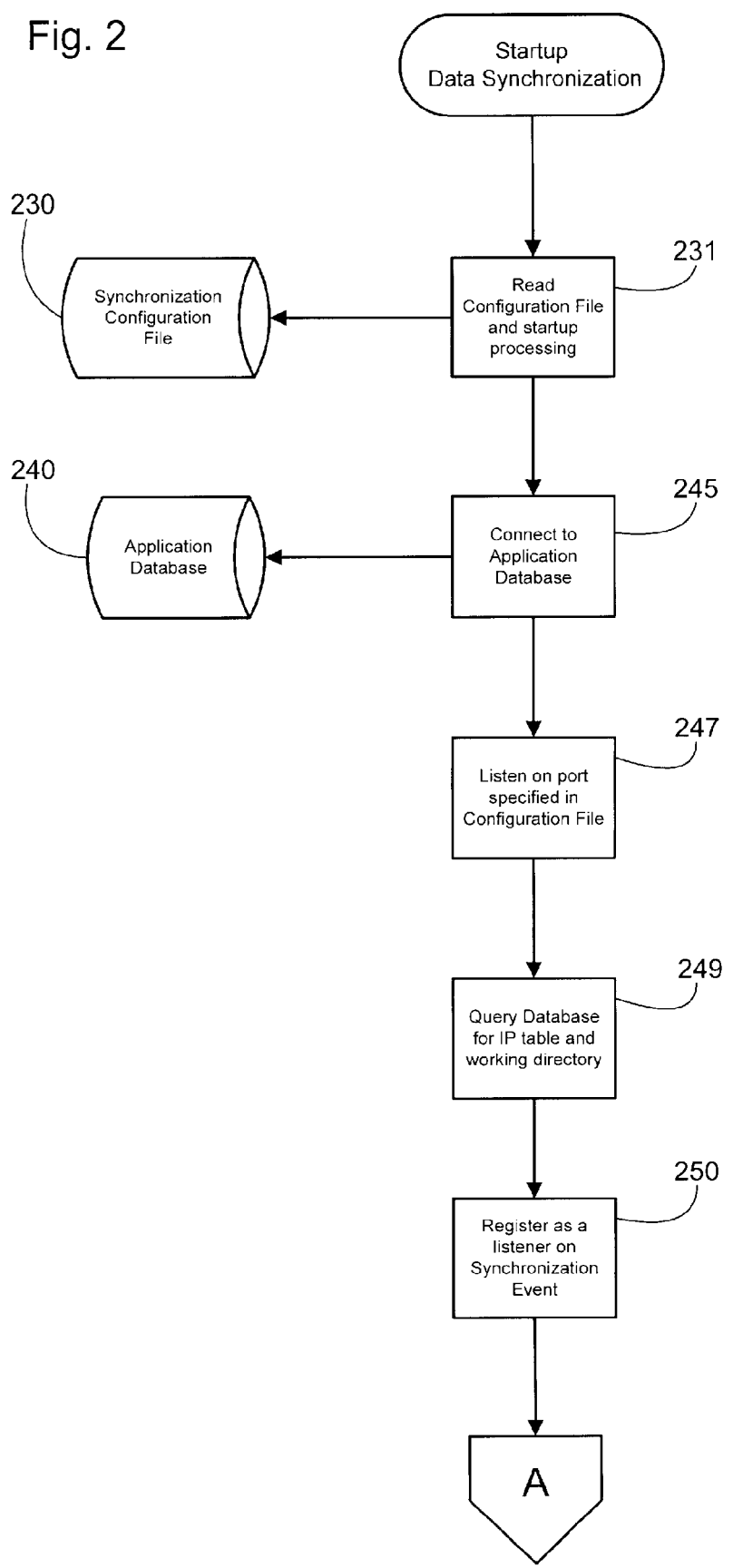

FIG. 2 Startup processing for data synchronization

Figure 3:
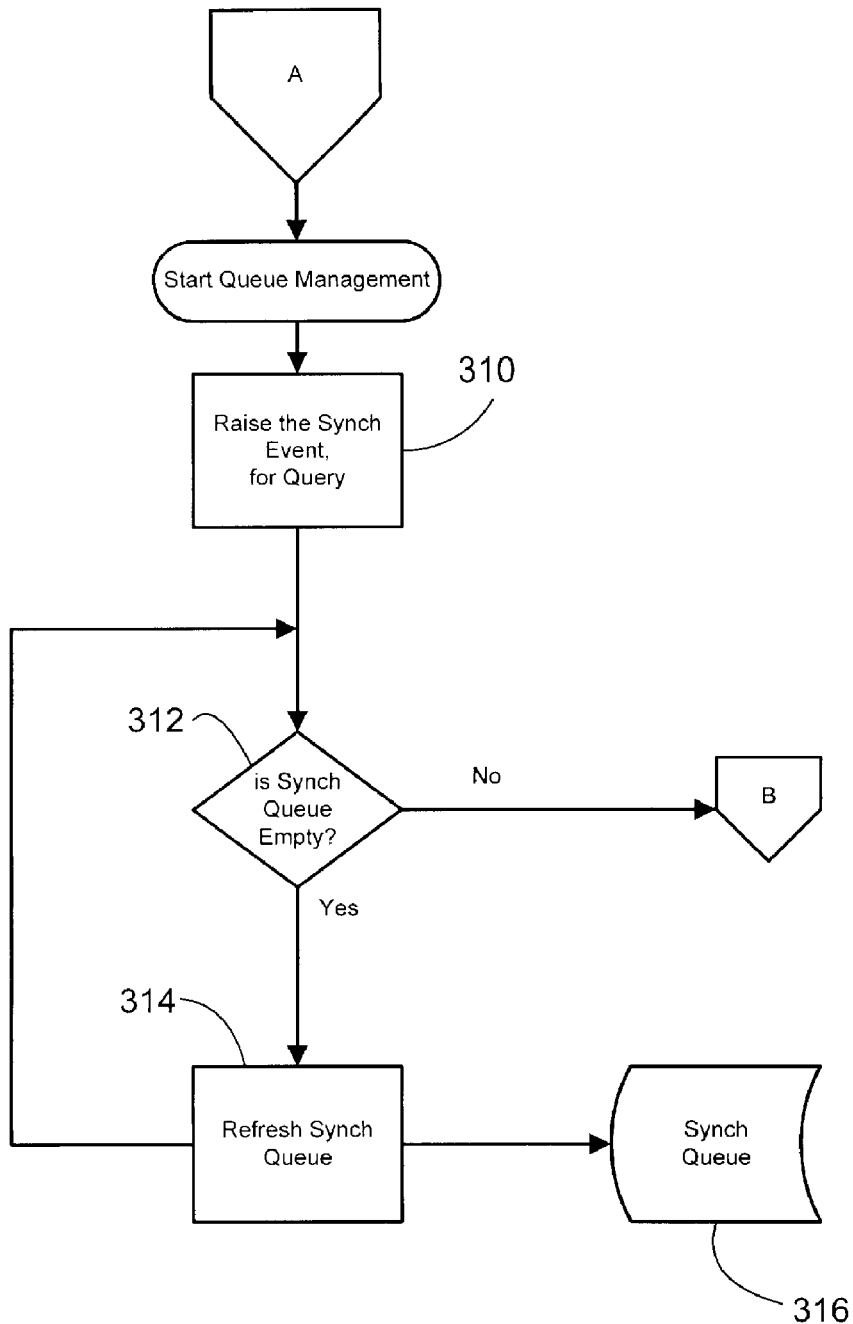

FIG. 3 Queue Management initial processing

Figure 4:
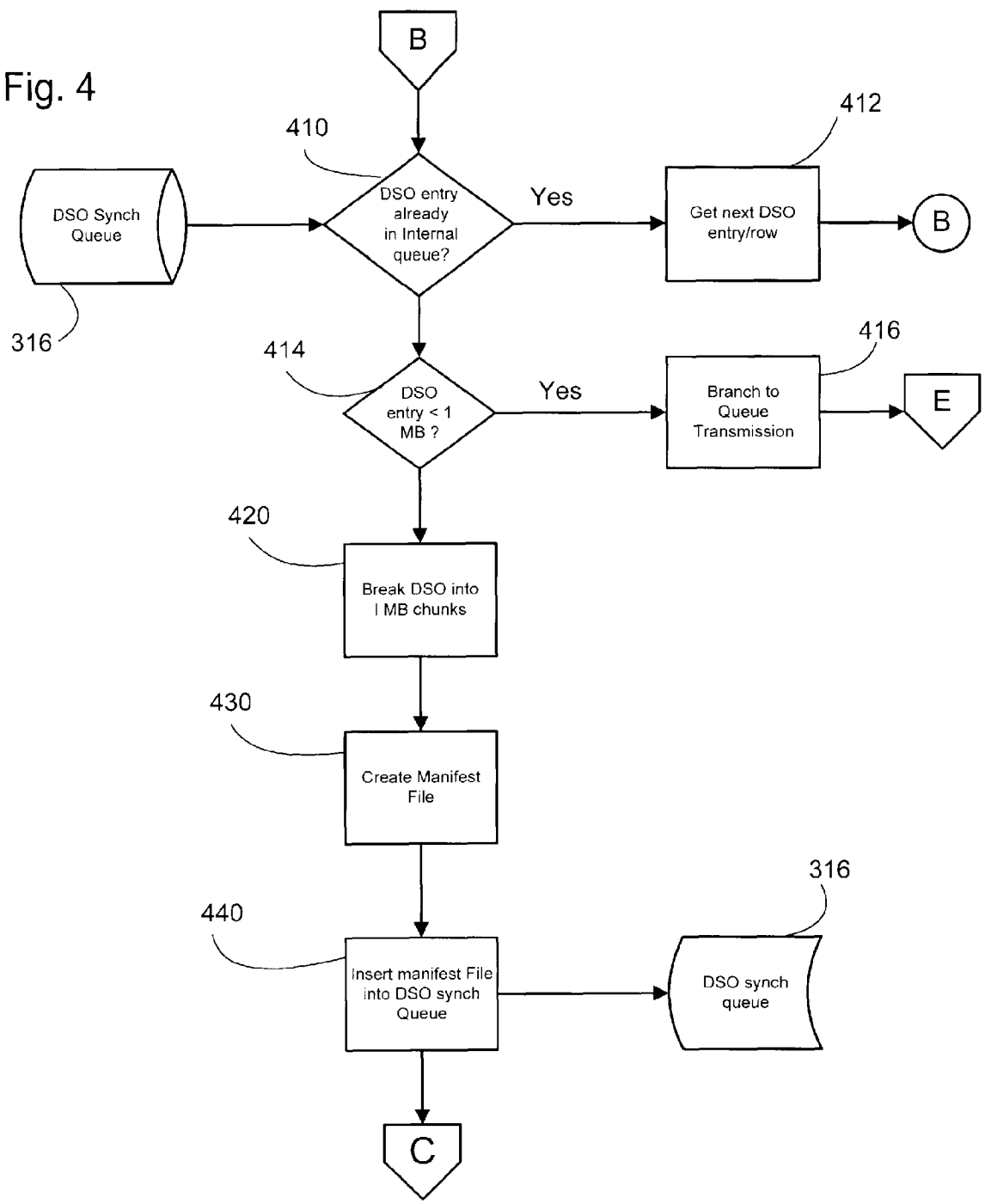

FIG. 4 Queue Management, continued processing for inserting DSO contents

Figure 5:
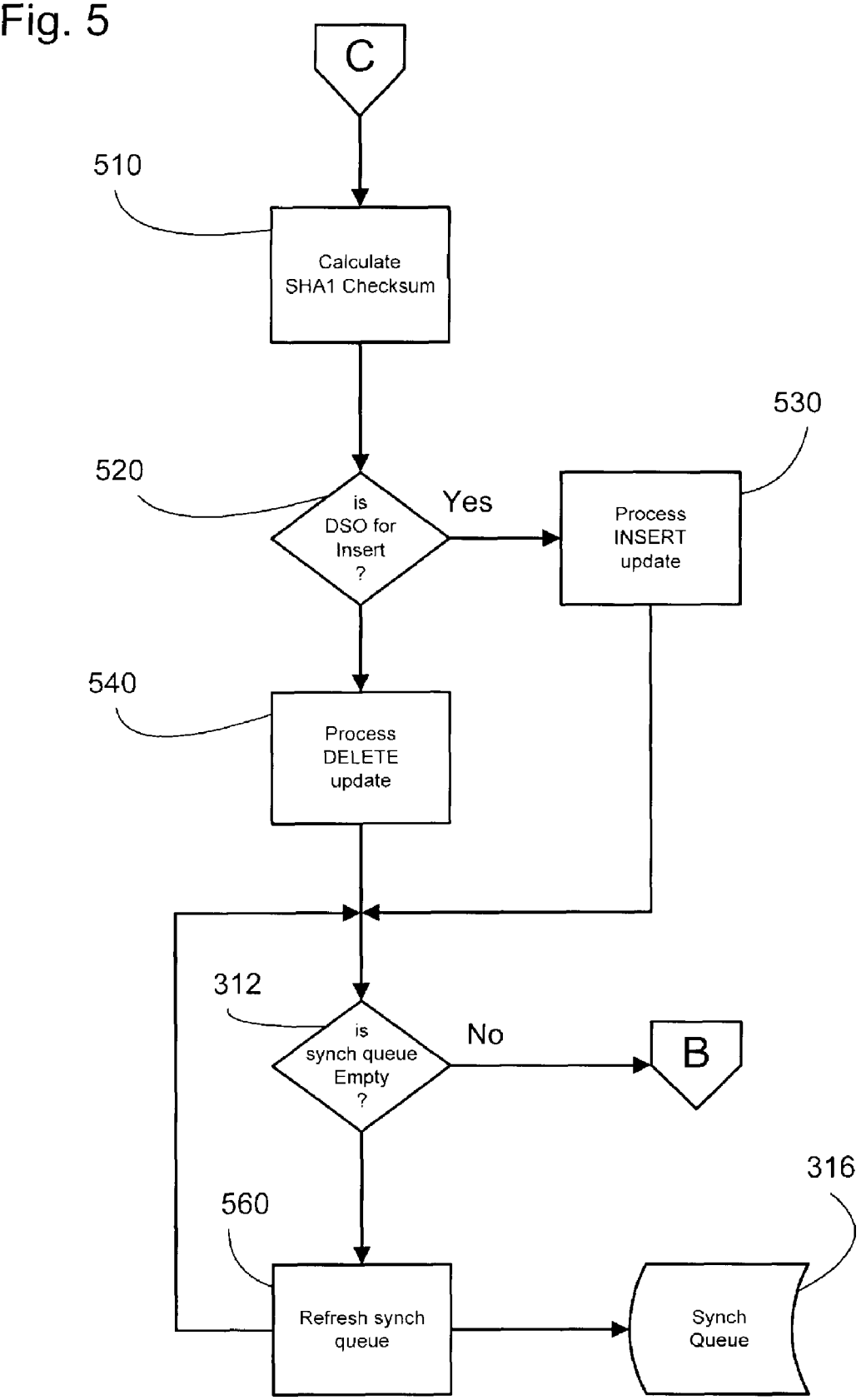
Figure 6:
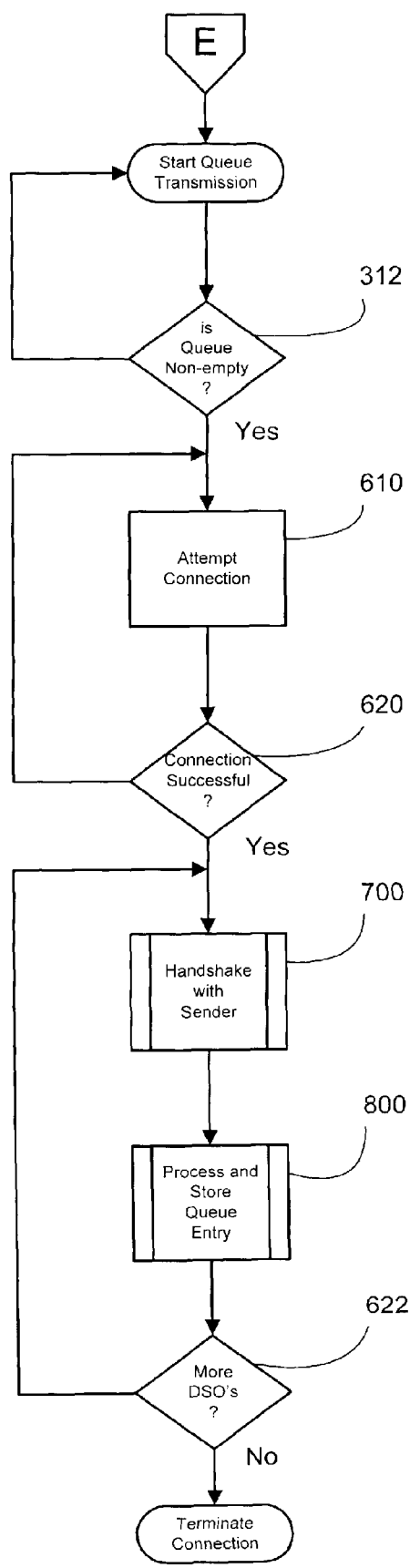

FIG. 5 Queue Management, continued processing for inserts or deletes to database FIG. 6 Queue Transmission, tablet to server or server to tablet

REFERENCE NUMERALS

10 server for network, providing access to application database
20 tablet computer as provided to users for access and update of the application database
30 Data Synchronization Object (DSO)
40 SHA1 checksum
230 configuration file containing control and location information for synchronization
240 application database comprises the data stored for operation of the application, including the server instance 241 and the tablet instances 242
241 server instance of the application database 240
242 tablet instance of the application database 240
245 connect to application database
247 Listen on port specified in Configuration File
249 Query Database for IP table and working directory
250 Register as a listener on Synchronization Event
310 Raise the Synch Event in order to query the queue
312 Synch Queue Empty is a query to check the synch queue 316 for DSO's 30
314 Refresh Synch Queue
316 synch queue
410 DSO entry already in Internal queue is a search and verify step to see if the currently processed DSO entry is a match for any other entry in the queue
412 Get next DSO entry/row
414 DSO entry less than 1 MB
416 Branch to Queue Transmission
420 Break DSO into 1 MB chunks
430 create manifest file
440 Insert manifest File into DSO synch Queue
510 Calculate SHA1 Checksum
520 DSO for Insert query
530 Process INSERT update
540 Process DELETE update
550 synch queue Empty query
560 Refresh synch queue
610 Attempt Connection
620 Connection Successful
622 more DSO's in transmission, query
700 Handshake with Sender
800 store and process queue entry, DSO 30

DETAILED DESCRIPTION

Preferred Embodiment

FIG. 1 High level overview of the hardware and communications used by an application using the present invention, showing the server computer(s) 10, where the server computer 10 accesses and stores the server instance 241 of the application database 240. The server computer(s) 10 communicate using wireless technology with the tablet computers 20, each of which stores and accesses the tablet instance 242 of the application database 240.

FIG. 2 On startup the synch software binds to a port in order to accept incoming connections and then connects to a database instance. The port and database instance are specified in a configuration file 230. This database connection 245 is held open for as long as the synch software is running. First, queries are made to the database 230 to obtain configuration information 231. In particular, the working directory for DSO's 30 and the table of IP addresses corresponding to synch peer 20 instances 242 are obtained. Synch then registers with the database as a listener 247 of a particular named event. When this event is fired by code executing in the database, the synch software receives a notification on its database connection 620 which it regards as a signal that new items have been inserted into the synch queue 316 (see FIG. 3). Finally, it makes an initial query 249 to build its internal representation of the synch queue 316. After all database queries 249 have completed, the synch software connects to all peer instances 242 it knows about and informs these instances that it is up and running and ready to exchange data. Any successful connections 250 transition into the queue transmission state. (processing continues in FIG. 3)

FIG. 3 Queue Management initial processing. When the database raises the event "synch" 310, the operating system Input/Output facility informs synch that there is data pending on that file descriptor. Synch then queries the database 240, via the open file descriptor, for any pending events. If the event "synch" has been raised, then synch regards its queue representation as stale and queries 312 the database 240 (not shown) to refresh its queue. This query returns the top 100 entries in the synch queue 316 for each peer 20, and these are used to refresh the synch queue 314. For each row returned, synch checks to see if that entry is already stored in its internal queue 316. If not, it inserts the row. If a peer's queue changes state from empty to non empty, a connection attempt 610 is scheduled (see FIG. 6 for detail). If the entry at the top of a queue is different than the current executing DSO 30, then the synch software will preempt the current transfer. Unsuccessful connections are scheduled for retry if the peer in question has a non-empty synch queue 316. (processing continues in FIG. 4)

FIG. 4 Queue Management, continued processing for each row returned, synch checks to see if that entry is already stored 410 in its internal queue 316. If not, it inserts the row. If it is already stored 410, then it gets the next 412 DSO 30 entry/row. If a peer's queue changes state from empty to non empty, a connection attempt 610 is scheduled (FIG. 5). If the entry at the top of a queue is different than the current executing DSO 30, then the synch software will preempt the current transfer. Some further actions are taken when a DSO 30 is inserted into the internal queue 316. First, the size of the DSO 30 is checked. If it less than one megabyte, an SHA1 checksum 40 is computed 510 and stored in the internal queue 316. If it is greater than one megabyte 414, the DOS is broken up in to one megabyte chunks 420. An extra file is created that lists each chunk and the name of the original DSO 30 so that the receiver can reassemble the chunks. This file is called a manifest 430. This extra file is sent to the receiver by inserting it 440 into the internal queue 316 right after the last chunk. All chunks, and the manifest 430 are then assigned 510 their SHA1 checksum 40, and the processing continues in FIG. 5.

FIG. 5 Queue Management, continued processing for inserts or deletes to application database 240. When a DSO 30 arrives at its destination/receiver the following steps are taken: (1) its header section is read. The routing string is processed. If the routing string indicates that the DSO 30 should be sent to other peers 20 in the network, inserts 530 are made into the synch queue 316. This routing step only happens on the server 10, (2) the body of the DSO 30 is read. Each section of the body contains data for a database 240 table. For each row contained in the DSO 30, a check is made to see whether this row already is in the database 240. If it isn't, then a determination is made as to whether or not it is to be inserted 520 into the target synch object, or if it is to be deleted 540. If it is a deletion, then an UPDATE SQL statement is constructed 540. If not, an INSERT SQL 530 statement is constructed, (3) Once all INSERT 530 and UPDATE 540 statements have been generated, they are applied to the local database 240 or other target object, based on the type of DSO 30. All statements are wrapped in a transaction so no partial updates happen. Constraints are also relaxed within the transaction so that tables can be modified in any order regardless of dependencies.

FIG. 6 Queue Transmission, tablet 20 to server 10 or server 10 to tablet 20 where network connectivity is not guaranteed for individual tablets 20, the system has to be robust in the face of total, but temporary, network outage. As soon as a queue becomes non empty 312, a connection attempt 610 is made. If that connection attempt 610 fails, another connection attempt 610 is scheduled. Once a connection is successful 620, a handshake 700 is executed where the software queries the peer 20 for its id and application version. If the id returned isn't the expected one, the connection is immediately terminated as erroneous. The application version is stored to compare against the application version associated with DSO's 30. If the handshake is successful 700, queue transmission begins. Each DSO 30 entry in the transmission is processed and then stored (FIG. 4) in the queue 316 for later update. If both connected instances have DSO's 30 queued up, queue transmission occurs in parallel. When the queue does not have 622 any more DSO's 30, the connection is terminated. If there are more DSO's to process 622, the transmission processing continues.

I claim:

1. A data-synchronization computer program stored on a computer storage medium and execution by a server (i0) with an application database (240) and many personal portable workstations (20) each with local copies of said application database, and all configured to communicate over a wireless network, comprising:

a data entry process disposed in each personal portable workstation (20) for wireless contact with server (i0), and providing for database updates of application database (240) that are thereafter replicated to every other personal portable workstation (20) in wireless contact with server (I0), and such producing database instances (241) in the server (I0) and local copy instances (242) in the personal portable workstations (20);

a data synchronization object (DSO) data structure (30) that includes control, priority, and originating user information, and further includes a database update data, wherein said control information directs which tables in the application database (240) and which personal portable workstations (20) should receive said database update data for database instances (241) in the server (i0) and local copy instances (242) in the personal portable workstations (20);

a plurality of synch queues (316) for holding and scheduling DSO data structures (30) for a wireless connection between server (I0) and a corresponding personal portable workstation (20) when it is available to receive a transmission;

a synch software for connecting (610) a personal portable workstation (20) to a corresponding synch queue (316) when at least one DSO data structure (30) is resident (312);

a connection detector (620) to allow transmission of the DSO data structures (30) according to their positions in the plurality of synch queues (316);

a parser (800) for receiving said DSO data structures (30) and for applying them to database instances (241) in the server (I0) and local copy instances (242) in the personal portable workstations (20);

wherein, each personal portable workstation (20) is configured to enable a user to work with a corresponding one of said database instances (241) in the server (I0) and local copy instances (242) in the personal portable workstations (20) independent of network status, and the synch software opportunistically synchronizes each local copy instance (242) in the personal portable workstations (20) with database instance (241) in the server (i0).

2. The data-synchronization computer program of claim 1, wherein:

a substantially automated service is provided for data entry at each personal portable workstation (20) for use by other personal portable workstations (20) and by a central management on an up-to-the-minute basis without requiring direct connections and manual intervention to effectuate data synchronization.

3. The data-synchronization computer program of claim 1, wherein:

a next DSO data structure (30) is not sent until a previous DSO data structure (30) has been processed for a receiving database instance (241, 242).

4. The data-synchronization computer program of claim 1, wherein:

DSO data structure (30) priority is based on a weak ordering defined by first comparing a priority which a user assigns to a DSO data structure (30), and then prioritized according to the order in which DSO data structures (30) are inserted into a respective synch queue (316).

5. The data-synchronization computer program of claim 1, wherein:
   each DSO data structure (30) in a synch queue (316) is configured to be preempted by a DSO data structure (30) with a higher priority by suspending a current transmission such that a new transfer begins immediately and continues until the sync queue (316) with the priority is empty.

6. The data-synchronization computer program of claim 1, further comprising:
   a startup process in which the synch software binds to a port in order to accept incoming connections and then connects to a database instance, wherein the port and database instance are specified in a configuration file (230);
   a database connection (245) is held open for as long as the synch software is running and queries are made to the database (230) to obtain configuration information including a working directory for DSO data structures (30) and a table of IP addresses corresponding to personal portable workstations (20) and local copy database instances (242);
   a synch registration process uses a listener (247) to detect a particular named event that is fired by code executing in the database (240), wherein the synch software regards a notification on a database connection (620) as a signal that new items have been inserted into a synch queue (316);
   an initial query (249) is configured to build internal representations of the synch queue (316), and after all database queries (249) have completed, the synch software connects to corresponding to personal portable workstations (20) and local copy database instances (242) and registers with them that it is up and running and ready to exchange data;
   wherein, any successful connections transition into a queue transmission state, and unsuccessful connections are scheduled for retry if there is a non-empty corresponding synch queue (316).

* * * * *